United States Patent
Dadachev et al.

(10) Patent No.: US 10,832,001 B2
(45) Date of Patent: Nov. 10, 2020

(54) MACHINE LEARNING TO IDENTIFY OPINIONS IN DOCUMENTS

(71) Applicant: Google LLC, Mountain View, CA (US)

(72) Inventors: Boris Dadachev, Jersey City, NJ (US); Kishore Papineni, Carmel, NY (US)

(73) Assignee: Google LLC, Mountain View, CA (US)

( * ) Notice: Subject to any disclaimer, the term of this patent is extended or adjusted under 35 U.S.C. 154(b) by 130 days.

(21) Appl. No.: 15/963,412

(22) Filed: Apr. 26, 2018

(65) Prior Publication Data

US 2019/0332666 A1    Oct. 31, 2019

(51) Int. Cl.
| | |
|---|---|
| *G06F 40/279* | (2020.01) |
| *G06F 40/30* | (2020.01) |
| *G06N 20/00* | (2019.01) |
| *G06F 3/0484* | (2013.01) |
| *G06F 40/284* | (2020.01) |

(52) U.S. Cl.
CPC ............ *G06F 40/30* (2020.01); *G06F 3/0484* (2013.01); *G06F 40/284* (2020.01); *G06N 20/00* (2019.01)

(58) Field of Classification Search
CPC .... G06F 17/27; G06F 17/2765; G06F 17/277; G06F 17/2775; G06F 17/2785; G06F 17/279; G06F 40/237; G06F 40/242; G06F 40/279; G06F 40/30; G06N 20/00
USPC .......... 704/1, 9, 10; 706/16, 20, 30; 715/275
See application file for complete search history.

(56) References Cited

U.S. PATENT DOCUMENTS

| | | | |
|---|---|---|---|
| 5,978,820 A * | 11/1999 | Mase ...................... | G06F 40/20 715/260 |
| 9,201,868 B1 | 12/2015 | Zhang et al. | |
| 10,162,900 B1 * | 12/2018 | Chatterjee ........... | G06F 16/9535 |
| 2005/0091038 A1 * | 4/2005 | Yi ........................ | G06F 17/2715 704/10 |
| 2009/0077069 A1 * | 3/2009 | Polanyi ................... | G06F 16/30 |
| 2010/0023311 A1 * | 1/2010 | Subrahmanian ...... | G06F 17/275 704/2 |
| 2011/0112995 A1 * | 5/2011 | Chang .................... | G06N 20/00 706/12 |

(Continued)

OTHER PUBLICATIONS

Wikipedia, "Word embedding", 6 pages, downloaded Apr. 13, 2020. (Year: 2020).*

(Continued)

*Primary Examiner* — Martin Lerner
(74) *Attorney, Agent, or Firm* — Dority & Manning, PA

(57) ABSTRACT

Example aspects of the present disclosure are directed to systems and methods that employ a machine-learned opinion classification model to classify portions (e.g., sentences, phrases, paragraphs, etc.) of documents (e.g., news articles, web pages, etc.) as being opinions or not opinions. Further, in some implementations, portions classified as opinions can be considered for inclusion in an informational display. For example, document portions can be ranked according to importance and selected for inclusion in an informational display based on their ranking. Additionally or alternatively, for systems which access and consider multiple documents, the portions of a document that are classified as opinion can be compared to similarly-classified portions of other documents to perform document clustering, to ensure diversity within a presentation, and/or other tasks.

20 Claims, 6 Drawing Sheets

(56) References Cited

U.S. PATENT DOCUMENTS

| | | | | |
|---|---|---|---|---|
| 2011/0184729 | A1* | 7/2011 | Nam | G06F 17/2755 704/9 |
| 2013/0103385 | A1* | 4/2013 | Ghosh | G06F 40/30 704/9 |
| 2014/0019118 | A1* | 1/2014 | Tromp | G06F 17/274 704/9 |
| 2014/0101081 | A1* | 4/2014 | Ni | G06F 40/30 706/12 |
| 2014/0173425 | A1 | 6/2014 | Hailpern et al. | |
| 2015/0095311 | A1* | 4/2015 | Gou | G06F 16/248 707/722 |
| 2015/0286953 | A1* | 10/2015 | Papadopoullos | G06F 17/2785 706/12 |
| 2015/0331937 | A1* | 11/2015 | Cardie | G06F 17/27 715/254 |
| 2016/0171386 | A1* | 6/2016 | Brun | G06F 40/211 706/12 |
| 2016/0179944 | A1* | 6/2016 | Allen | G06F 16/24578 707/731 |
| 2016/0180218 | A1* | 6/2016 | Clark | G06N 20/00 706/46 |
| 2016/0253597 | A1* | 9/2016 | Bhatt | G06N 20/00 706/12 |
| 2016/0314506 | A1* | 10/2016 | Kang | G06F 40/30 |
| 2017/0034107 | A1* | 2/2017 | Krishnaswamy | G06F 17/289 |
| 2017/0286379 | A1 | 10/2017 | Dani et al. | |
| 2018/0032845 | A1* | 2/2018 | Polak | G06K 9/6269 |
| 2018/0040019 | A1* | 2/2018 | Gavlovski | G06F 16/24578 |
| 2018/0181678 | A1* | 6/2018 | Wang | G06F 17/271 |
| 2018/0203848 | A1* | 7/2018 | Perez | G06F 17/2785 |
| 2018/0365562 | A1* | 12/2018 | Volkova | G06F 40/30 |
| 2019/0138575 | A1* | 5/2019 | Toba | G06F 40/30 |
| 2019/0171913 | A1* | 6/2019 | Cheng | G06N 3/04 |

OTHER PUBLICATIONS

Will Koehrsen, "Neural Network Embeddings Explained", Towards Data Science, https://towardsdatascience.com/neural-network-embeddings-explained-4d028e6f0526, 20 pages, Oct. 1, 2018. (Year: 2018).*
Carenini et al., "Extracting Knowledge from Evaluative Text", Knowledge Capture, Association for Computing Machinery, Oct. 2, 2005, New York, New York, pp. 11-18.
Carenini et al., "Interactive Multimedia Summaries of Evaluative Text", 2006 International Conference on Intelligent User Interfaces, Jan. 29-Feb. 1, 2006, Sydney, Australia, pp. 124-131.
International Search Report and Written Opinion for PCT/US2019/028300, dated Jul. 25, 2019, 15 pages.
Pang, et al., "Opinion Mining and Sentiment Analysis", Foundations and Trends in Information Retrieval, vol. 2, Jan. 1, 2008, 94 pages.
Rizk et al., "Syntactic Genetic Algorithm for a Subjectivity Analysis of Sports Articles", retrieved on Jul. 16, 2019, https://www.researchgate.net/profile/Yara_Rizk/publication/27868334'_Syntactic_Genetic_Algorithm_for_a_Subjectivity_Analysis_of_Sports_Articles/links/5b0000554585154aeb049cd2/Syntactic-Genetic-Algorithm-for-a-Subjectivity-Analysis-of-Sports-Articles.pdf, 8 pages.

* cited by examiner

MACHINE LEARNING TO IDENTIFY OPINIONS IN DOCUMENTS

FIELD

The present disclosure relates generally to use of machine learning to identify opinions in documents. More particularly, the present disclosure relates to systems and methods that employ one or more machine-learned models to classify portions of documents as opinion or not opinion, whereby, for example, portions classified as opinion can be considered for inclusion in an informational display.

BACKGROUND

Understanding of content (e.g., textual content) contained in a document by a computing system is a challenging problem. Even in the professional news journalism space, where articles are typically written in high quality language and syntax, computing systems are currently able to understand only very little about the actual content of news articles. Furthermore, determining how a given article compares to other, related news articles written by other journalists is an even more challenging task.

Production systems which select and provide documents (e.g., news articles) to users rely almost exclusively on shallow content signals (e.g., salient terms and entities, etc.) and/or metadata (e.g., how important a publisher is, when the content was published (e.g., relative to other articles), references (e.g., links) between articles, etc.). Thus, such production systems typically do not rely on a nuanced understanding of the actual content of the documents themselves.

There are a number of research areas related to computerized understanding of document content. Work in the area of subjectivity detection tries to identify subjective text. Subjectivity detection techniques often use a lexicon or a model trained using a lexicon, and the use of such a lexicon is inherently limiting. Also, subjectivity in itself is not particularly informative: "This is great!" is a subjective sentence, but in isolation it is not very informative.

Work in the area of sentiment analysis tries to capture the sentiment (i.e., positive, negative or neutral) of text generally, or the sentiment about some particular aspect/topic/entity (e.g., positive or negative view on an international treaty). Sentiment analysis at the sentence level does not, however, provide any understanding of what the text actually says. Sentiment analysis at the aspect/topic/entity level is more insightful, but has restrictions: the aspect/topic/entity must exist in some knowledge base and it may be difficult to determine how two aspects/topics/entities relate.

Finally, work in the related area of stance detection is usually cast as finding for/against a given topic (e.g., a proposed legislative action). However, the resulting systems only work for the topics they are trained on and therefore have limited applicability to new or developing topics.

SUMMARY

Aspects and advantages of embodiments of the present disclosure will be set forth in part in the following description, or can be learned from the description, or can be learned through practice of the embodiments.

One example aspect of the present disclosure is directed to a computing system. The computing system includes one or more processors and one or more non-transitory computer-readable media that collectively store: a machine-learned opinion classification model configured to classify portions of documents as either opinion or not opinion; and instructions that, when executed by the one or more processors, cause the computing system to perform operations. The operations include obtaining data descriptive of a document that comprises a one or more portions. The operations include inputting at least a first portion of the document into the machine-learned opinion classification model. The operations include receiving, as an output of the machine-learned opinion classification model, a first classification of the first portion of the document as being opinion or not opinion.

Another example aspect of the present disclosure is directed to a computer-implemented method. The method includes obtaining, by one or more computing devices, data descriptive of a document that comprises a plurality of portions. The method includes inputting, by the one or more computing devices, each of the plurality of portions into a machine-learned opinion classification model to obtain a respective classification of each of the plurality of portions as being opinion or not opinion. The method includes selecting, by the one or more computing devices, at least one portion of the document classified as being opinion. The method includes providing, by the one or more computing devices, the at least one portion of the document for inclusion in an informational display.

Another example aspect of the present disclosure is directed to a system. The system includes one or more processors and one or more non-transitory computer-readable media that store instructions that when executed by the one or more processors cause the system to provide a user interface that includes one or more opinion labels respectively applied to one or more portions of a document by a machine-learned opinion classification model. The opinion label for each of the one or more portions of the document indicates whether such portion of the document is opinion or not opinion.

Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1A:
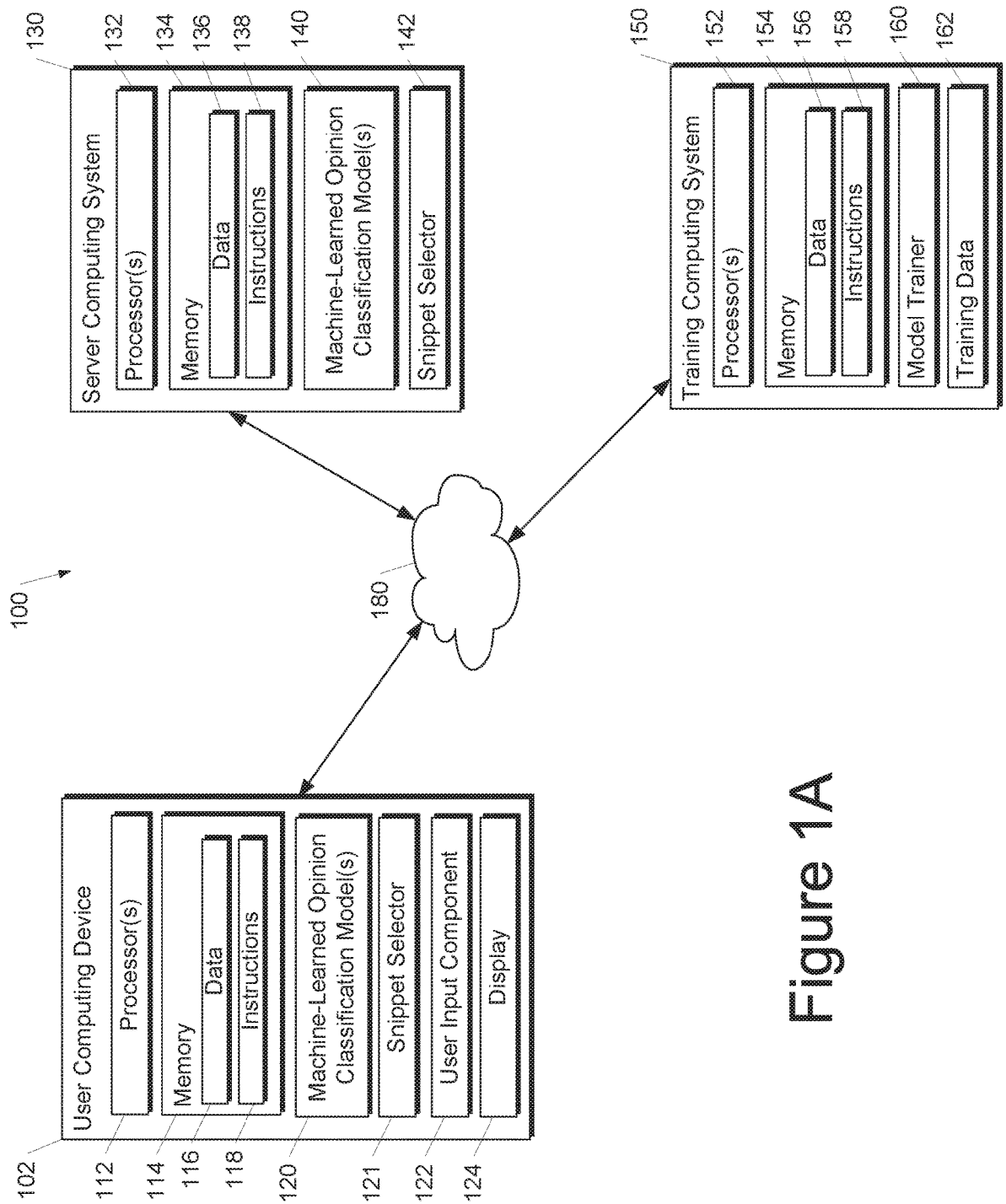
FIG. 1A depicts a block diagram of an example computing system according to example embodiments of the present disclosure.

Reference numerals that are repeated across plural figures are intended to identify the same features in various implementations.

DETAILED DESCRIPTION

Overview

Example aspects of the present disclosure are directed to systems and methods that employ a machine-learned opinion classification model to classify portions (e.g., sentences, phrases, paragraphs, etc.) of documents (e.g., news articles, web pages, etc.) as being opinions or not opinions. Further, in some implementations, portions classified as opinions can be considered for inclusion in an informational display. For example, document portions can be ranked according to importance and selected for inclusion in an informational display based on their ranking. Additionally or alternatively, for systems which access and consider multiple documents, the portions of a document that are classified as opinion can be compared to similarly-classified portions of other documents to perform document clustering, to ensure diversity within a presentation, and/or other tasks.

Thus, in some implementations, a computing system can include two main components: (1) a machine-learned opinion classification model, which obtains portions from a document and classifies them as opinionated or not opinionated; and (2) a summarization algorithm, which ranks portions from a document by portion importance (possibly as well as other example criteria like ability to stand alone without further context). As described further herein, there are a number of ways these two components can interact to select (e.g., for presentation to a user) a document portion that is both important and opinionated.

In one example application, a computing system can generate an informational display that identifies a number of documents and provides a summary or "snippet" for each document, where the snippet for each document includes or is derived from a portion of the document that has been classified as opinion and/or ranked as having high importance. Such an informational display might be used in the context of providing search results responsive to a search query, as part of a "top stories" or "what to read next" feature of a news aggregation/presentation application, and/or in other scenarios, including, for example, presentation of a number of different news articles that relate to the same overarching news "story."

Thus, the present disclosure provides systems and methods which can leverage machine-learning to generate improved summaries or "snippets" of documents such as news articles to a user. By providing snippets which better reflect actual opinionated content (e.g., rather than generic facts or quotes), the user is able to more quickly comprehend the true nature of the document and ascertain whether she is interested in reading the document in full. In such fashion, the user is able to avoid loading and reading documents in which she is not interested in reading, thereby conserving processing, memory, and network resources of the computing system. Likewise, by identifying and comparing portions of documents which have been classified as actual opinionated content (e.g., rather than generic facts or quotes), the systems and methods of the present disclosure are able to provide informational displays with improved diversity, structure, and/or other features which take into account the actual content of the documents themselves. In such fashion, the user is able to easily ascertain a more diverse representation of the different stances included in the documents. Therefore, the user can avoid reading articles which feature redundant opinions, thereby again conserving processing, memory, and network resources of the computing system.

More particularly, opinions (e.g., as contained in editorials, "op-eds," commentaries, and/or the like) play an essential role in the news journalism ecosystem. They provide a place for editorial teams, outside experts, and ordinary citizens to voice their points-of-view, and as such, to take part in the public debate on a given issue or news event. In this way, they can help the public see the different sides of a story and break filter bubbles.

In some instances, an opinion can include a viewpoint or conclusion that an author of a document explicitly writes into that document. However, in other instances, opinions or opinionated portions of a document can be less explicitly recognizable as such. As one example, a rhetorical question can be a form of opinion depending on its phrasing (e.g., including sarcasm). As another example, a summary of facts can be an opinion or indicative of an opinion depending on which sections of the overall facts are selected, the order they are presented, interstitial wording, or other factors. Thus, determining whether a portion of a document is opinion is a challenging task that requires a nuanced understanding of human communication.

A computer system that aggregates and presents news articles to a user can include or show a snippet for a particular article. In certain existing systems, this snippet simply mimics or mirrors the headline of the article. In other instances, the snippet can be the output of a generic multi-document extractive summarization algorithm. However, a generic summarization algorithm typically does not consider the subjectivity of a piece of text. Thus, if trying to highlight and summarize the subjective portions of an opinion piece, a generic summarization algorithm would typically not be able to identify a summary that effectively conveys the actual opinion put forth by the article. Likewise, stance detection would be extremely useful to enable a better understanding of stories (e.g., clusters of articles from different publishers on the same news event). However, stance is hard to define and as such to quantify.

In view of these challenges, the present disclosure recognizes that news documents typically come in two main flavors, neutral reporting of news events and opinions cast on these events. Being able to separate opinionated from neutral text in news articles is useful to filter out non-stance carrying text, which can further assist in performing stance detection. In particular, the present disclosure can, in some implementations, be used to perform stance detection or other related tasks by identifying opinionated portions in documents and relating opinionated portions inside the document and/or across other documents (e.g., that relate to the same story). Additionally or alternatively, the systems and methods of the present disclosure can also be used to surface opinionated snippets or quotes to users of a news aggregation/presentation application and/or in the form of search results.

More particularly, according to an aspect of the present disclosure, a computing system can use or leverage a machine-learned opinion classification model to identify portions of a document that convey opinion (e.g., as contrasted with quotes and facts). Stated differently, this classification model can be used to filter "un-interesting" portions for stance detection purposes, such as, for example, quotes and facts. The computing system can input each portion into the opinion classification model and the model can produce a classification for the input portion. Example documents include news articles, web pages, transcripts of a conversation (e.g., interview), transcripts of a speech, and/or other documents. Example portions of a document include sentences, pairs of consecutive sentences, paragraphs, pages, etc. Portions can be overlapping or non-overlapping.

In particular, "opinionatedness" (i.e., the degree to which something is or conveys opinion) is somewhat subjective and extremely topic- and context-dependent. For this reason, and because simpler methods have clear limitations, the systems and methods of the present disclosure use a machine learning approach. As one example drawback of existing approaches, use of a pre-defined lexicon does not sufficiently account for the context in which a portion is presented. For example, the term "short-sighted" is clearly an opinionated word in a politics article, but is probably not in a medical article. Similarly, "dedicated" is opinionated when qualifying a person but not when qualifying an object. Thus, basic use of a lexicon to identify opinionated portions does not appropriately capture or account for context. By contrast, use of a machine-learned model as described herein provides superior results which evince contextual and/or topic-dependent understanding and classification.

As one example, in some implementations, the machine-learned opinion classification model can include one or more artificial neural networks ("neural networks"). Example neural networks include feed-forward neural networks, recurrent neural networks, convolutional neural networks, and/or other forms of neural networks. Neural networks can include layers of hidden neurons and can, in such instances, be referred to as deep neural networks.

In one specific example, the machine-learned opinion classification model can include an embedding model that encodes a received portion of the document. For example, the embedding model can produce an embedding at a final or a close to final, but not final layer of the model. The embedding can encode information about the portion of the document in an embedding dimensional space. The machine-learned opinion classification model can also include a label prediction model that generates the classification label based on the encoding or embedding.

As examples, the embedding model can be or include a recurrent neural network (e.g., a unidirectional or bidirectional long short-term memory network) while the label prediction model can be or include a feed-forward neural network (e.g., a shallow network with only a few layers). As another example, the embedding model can be or include a convolutional neural network that has one dimensional kernels designed over words. As further examples, the machine-learned opinion classification model can include or leverage sentence embeddings, bag-of-word models (e.g., unigram, bigram and/or trigram levels), and/or other forms of models.

In some implementations, the opinion classification model can be a binary classifier. For example, the model can produce a label of "Opinion" or "Not Opinion" for each portion of the document that is input into the model. In other implementations, the opinion classification model can be a multi-class classification model. In particular, in some implementations, the classification model can output one of following three classes: Not Opinion; Reported Opinion (e.g., representing the opinion of a third party such as, for example, quoting someone's opinion); and Author Opinion (e.g., representing the opinion of the author of the document). In some implementations, portions classified as "Opinion" or "Author Opinion" can be considered for inclusion in an informational display (e.g., in the form of opinionated snippets). In yet further implementations, additional and/or different labels can be used versus those described above. As one example, in some implementations, additional labels can be used (e.g., in addition to "Opinion" or "Not Opinion") that account for cases in which a portion of the document is challenging to classify (e.g., is on the border between opinion and not-opinion) or contains a mix of fact and opinion. For example, such additional labels could include a "May Be Opinion" label, a "Possible Author's Perspective" label, and/or a "Mixed Fact and Opinion" label. Generally, any number of different labelling schemes can be designed and applied during training to train the labelling output of the classification model.

In some implementations, the classification model can simply output a label while, in other implementations, the classification model can output a classification score and the label can be generated based on the classification score (e.g., by comparing the score to a threshold). In some instances, the classification score can be referred to as a confidence score. Generally, a larger classification score indicates that the corresponding portion is more opinionated or more probably opinionated. In one example, the classification model can output a classification score that ranges from 0 to 1, where 0 corresponds to wholly not opinion and 1 corresponds to wholly opinion. Thus, a classification score of 0.5 may indicate a mix of opinion of not opinion.

In some implementations, the classification model can output a single score and the label can be generated based on such single classification score (e.g., by comparing the score to one or more thresholds). In other implementations, the classification model can output a respective score for each available label and one or more labels can applied to the portion based on the multiple scores (e.g., by comparing each respective score to a respective threshold and/or by selecting the label that received the highest score).

In some implementations, additional features can be used (e.g., provided as input alongside the document itself to the model or used separately as additional selection logic). Examples of such additional features include: a lexicon, main article topic(s), surrounding context, story context, document type (e.g., news article vs. medical academic paper), context on publisher and/or journalist, and/or other features. In one particular example, only portions of a document that were classified as opinion and that also have at least two strongly subjective words according to a subjectivity lexicon are selected.

The machine-learned opinion classification model can be trained according to or based on a number of different training schemes and/or training datasets. In one particular example, two training datasets can be used. A first training dataset can include opinion pieces from a news corpus, where opinion labels are applied at the document level. A second, better quality training dataset can include documents with portions that have been individually and manually labelled using crowdsourcing. For example, the labels can be applied according to two classes: sentence reflects the opinion of the author, and everything else; or according to the three classes described above which include a distinction between author opinion and reported opinion.

In some implementations, the first training dataset can be used to improve or seed the classification model (e.g., to learn an embedding, to leverage labeled but noisy data), while the second training dataset enables training of a higher precision classifier. In other implementations, the machine-learned opinion classification model can be trained on only the second training dataset. Further, in some implementations, a pre-trained language processing model (e.g., trained on other tasks) can be re-trained on the first and/or second training datasets to generate the opinion classification model. Example pre-trained language processing models include the Word2vec ground of models. In implementations in which the opinion classification model includes multiple models (e.g., an embedding model and a label prediction model), training can be performed end-to-end on the models jointly.

In some implementations, the first training dataset can be generated by identifying opinion articles through application of various search rules. As one example, a computing system can extract opinion and non-opinion articles from a news corpus, for example by looking for particular keywords (such as "opinion" or "oped") in the URL or the body of the article. For the first training dataset, all sentences from the identified articles can be extracted. The label of the document can then be assigned to each portion (e.g., sentence) from such document. This provides a relatively simple and fast technique to generate a large first training dataset.

However, this first training dataset has a drawback due to the way it is constructed: the resulting classification model learns to predict whether the sentence is likely to be part of an opinion piece, rather than whether it expresses an opinion. Thus, training on the more fine-grained second training dataset results in significant improvement. Likewise, in some implementations, training of the model is performed only using the second training dataset and not the first.

In some implementations, for the second dataset, additional data can be collected on a number of related aspects: Whether the sentence is boilerplate ("Sign up to receive our awesome newsletter!"); Whether the opinion expressed is the author's own (as opposed to reported opinions in, for example, quotes); Whether the sentence can stand on its own; and/or Whether the sentence can be understood only knowing the article title.

Thus, the example training schemes described above enable the machine-learned opinion classification model to learn how opinions are expressed from a large annotated corpus. Further, in implementations in which the model takes the entire portion as an input (e.g., models that include a recurrent neural network that takes each word as input sequentially), the model can be trained to understand and leverage structural information included in the portions, including, for example, sentence structure.

In particular, a training computing system can obtain document data that includes opinion labels. The training computing system can determine correlations between aspects of the document data (e.g., sentence structure, word choice, punctuation, syntax, formatting, and/or document features) and opinion classifications. The training computing system can iteratively update the correlations upon receipt of new document data to form the opinion classification model. Once trained, the opinion classification model can be used to identify opinions within documents.

Furthermore, the machine-learned classification model is not limited to a narrow domain (e.g., a specific dictionary or lexicon) but instead can process any language inputs. In addition, the opinion classification model is easily extensible to other languages (e.g., by generating training datasets for such other languages).

According to another aspect of the present disclosure, the computing system can generate a snippet or summary for the document based on the classifications generated by the opinion classification model. In particular, in some implementations, the computing system can perform a ranking process that determines which portion (e.g., sentence(s)) would serve best as a standalone snippet. In some instances, the selected portion should generally be relevant to the story and read well without context. As examples, the ranking can be generated based at least in part on a summarization of each respective portion, identification of respective entities mentioned by each respective portion, and/or a respective classification score assigned to each respective portion by the machine-learned opinion classification model. Determining importance can be done by looking at the document only, or by looking at clusters of documents. This latter option allows the computing system to diversify the point-of-views highlighted in the snippets.

In particular, in some implementations, the computing system can perform one or more document summarization algorithms to rank the portions of the document and select the snippet. In some implementations, the document summarization algorithm will choose a set of candidate portions for each document, taking into account portion importance, portion opinionatedness (e.g., as reflected by the portion's corresponding classification score), and/or snippet diversity across articles in the cluster (e.g., story).

In one example, the computing system can perform a standard document summarization algorithm, but restrict the input to the algorithm to only portions labelled as opinions by the classification model. As another example, the summarization algorithm can discard all sentences unsuitable as snippets, and then the computing system can select the most opinionated sentence, as indicated by the scores produced by the classification model.

As yet another example, a document summarization algorithm can combine both sentence importance and opinionatedness to re-rank sentences. For example: sort sentences in decreasing order of importance_score*opinion_confidence. If no sentence is deemed opinionated, a non-opinionated sentence may be returned. This example implementation is the most flexible and also allows incorporation of additional heuristics (e.g., the snippet could be restricted to the top three portions according to the summarization algorithm).

Thus, in one example application, the systems and methods of the present disclosure can be used for selecting snippets that reflect the author's opinion for opinion pieces in a news aggregation/presentation application. Opinion pieces can be displayed in opinion blocks (e.g., alongside additional opinion pieces for a given news story), can be displayed alongside non-opinion pieces, or can be displayed standing alone. One example goal is to provide snippets enticing the users to read an opinion piece.

In another example application, the opinion classification model provides a way to filter sentences that cast a light on authors' opinions, discarding factual sentences and other un-interesting sentences (e.g., quotes). Conversely, the opinion classification model also provides a means to select only neutral or factual sentences for non-opinion articles (e.g., by removing sentences labeled as opinion).

In another example, the respective opinion sentences in articles across an entire news story can be clustered to understand which articles share the same point of view. This can enable a better understanding of individual articles and comparison between articles on the same news event or overarching story. More precisely, by isolating the point-of-view/opinions of an author, the computing system is able to determine how perspectives are shared or differ between several authors and newspapers, which allows for clustering, diversification, and/or other tasks.

Further, by clustering based on opinionated portions, a more nuanced understanding of the different positions held with respect to a subject can be ascertained. That is, in typical sentiment analysis or stance detection approaches, there are a fixed and finite set of sentiments (e.g., generally "for", "against", or "neutral"). However, by clustering based on opinionated portions, it might be revealed that in fact there are six or seven overlapping but distinct positions regarding a certain subject. Thus, in the opinion identification and snippet selection techniques described herein, there is no fixed, finite set of positions to train on but instead a more natural and nuanced clustering of opinions can be obtained.

Thus, the present disclosure provides systems and methods which can leverage machine-learning to generate improved summaries or "snippets" of documents such as news articles to a user. By providing snippets which better reflect actual opinionated content (e.g., rather than generic facts or quotes), the user is able to more quickly comprehend the true nature of the document and ascertain whether she is interested in reading the document in full. In such fashion, the user is able to avoid loading and reading documents in which she is not interested in reading, thereby conserving processing, memory, and network resources of the computing system. Likewise, by identifying and comparing portions of documents which have been classified as actual opinionated content (e.g., rather than generic facts or quotes), the systems and methods of the present disclosure are able to provide informational displays with improved diversity, structure, and/or other features which take into account the actual content of the documents themselves. In such fashion, the user is able to easily ascertain a more diverse representation of the different stances included in the documents. Therefore, the user can avoid reading articles which feature redundant opinions, thereby again conserving processing, memory, and network resources of the computing system.

The systems and methods of the present disclosure provide a number of technical effects and benefits. As one example, the systems and methods of the present disclosure can improve the functioning of a computing system by, for example, saving processing or memory resources. For example, by providing snippets which better reflect actual opinionated content (e.g., rather than generic facts or quotes), the user is able to more quickly comprehend the true nature of the document and ascertain whether she is interested in reading the document in full. In such fashion, the user is able to avoid loading and reading documents in which she is not interested in reading, thereby conserving processing, memory, and network resources of the computing system. Likewise, by identifying and comparing portions of documents which have been classified as actual opinionated content (e.g., rather than generic facts or quotes), the systems and methods of the present disclosure are able to provide informational displays with improved diversity, structure, and/or other features which take into account the actual content of the documents themselves. In such fashion, the user is able to easily ascertain a more diverse representation of the different stances included in the documents. Therefore, the user can avoid reading articles which feature redundant opinions, thereby again conserving processing, memory, and network resources of the computing system.

With reference now to the Figures, example embodiments of the present disclosure will be discussed in further detail.

Example Devices and Systems

FIG. 1A depicts a block diagram of an example computing system 100 that identifies opinions within documents according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a smart speaker, a computing device that is able to be worn, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned opinion classification models 120. For example, the machine-learned opinion classification models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks, or other forms of neural networks. Alternatively or additionally, the opinion classification models 120 can include one or more other forms of machine-learned models such as, as examples, linear classification models; quadratic classification models; regression models (e.g., simple linear regression models, multiple linear regression models, logistic regression models, stepwise regression models, multivariate adaptive regression splines, locally estimated scatterplot smoothing models, etc.); one or more decision tree-based models (e.g., classification and/or regression trees, iterative dichotomiser 3 decision trees, C4.5 decision trees, chi-squared automatic interaction detection decision trees, decision stumps, conditional decision trees, etc.); one or more kernel machines; one or more support vector machines; one or more nearest neighbor models (e.g., k-nearest neighbor classifications models, k-nearest neighbors regression models, etc.); one or more Bayesian (e.g., naïve Bayes models, Gaussian naïve Bayes models, multinomial naïve Bayes models, averaged one-dependence estimators, Bayesian networks, Bayesian belief networks, hidden Markov models, etc.); and/or other forms of models. Example machine-learned opinion classification models 120 are discussed with reference to FIGS. 2 and 3.

In some implementations, the one or more machine-learned opinion classification models 120 can be received from the server computing system 130 over network 180, stored in the user computing device memory 114, and then used or otherwise implemented by the one or more processors 112. In some implementations, the user computing device 102 can implement multiple parallel instances of a single machine-learned opinion classification model 120 (e.g., to perform parallel identification of opinionated portions across multiple documents).

Additionally or alternatively, one or more machine-learned opinion classification models 140 can be included in or otherwise stored and implemented by the server computing system 130 that communicates with the user computing device 102 according to a client-server relationship. For example, the machine-learned opinion classification models 140 can be implemented by the server computing system 140 as a portion of a web service (e.g., an opinion classification and/or news presentation service). Thus, one or more models 120 can be stored and implemented at the user computing device 102 and/or one or more models 140 can be stored and implemented at the server computing system 130.

In some implementations, the user computing device 102 can include a snippet selector 121. In some implementations, the snippet selector 121 can select a snippet of a document for inclusion in an informational display. For example, snippet selector 121 can select a snippet of a document for inclusion in an informational display based on classifications output by the machine-learned opinion classification model 120. In particular, in some implementations, the snippet selector 121 can perform a summarization algorithm that ranks portions from a document by portion importance (possibly as well as other example criteria like ability to stand alone without further context). An example snippet selector 121 is discussed with reference to FIG. 2.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The user computing device 102 can also include a display 124. For example, the display 124 can be a touch-sensitive display screen. Thus, in some instances, the display can be a user input component 122. As examples, the display 124 can be a liquid crystal display (LCD) or organic light-emitting diode (OLED) part of a touch screen, can be a non-touchscreen direct view display component such as a cathode ray tube (CRT), light-emitting diode (LED), LCD, or OLED. The display 124 can also be a projector instead of a direct view display.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned opinion classification models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Alternatively or additionally, the opinion classification models 120 can include one or more other forms of machine-learned models such as, as examples, linear classification models; quadratic classification models; one or more regression models (e.g., simple linear regression models, multiple linear regression models, logistic regression models, stepwise regression models, multivariate adaptive regression splines, locally estimated scatterplot smoothing models, etc.); one or more decision tree-based models (e.g., classification and/or regression trees, iterative dichotomiser 3 decision trees, C4.5 decision trees, chi-squared automatic interaction detection decision trees, decision stumps, conditional decision trees, etc.); one or more kernel machines; one or more support vector machines; one or more nearest neighbor models (e.g., k-nearest neighbor classifications models, k-nearest neighbors regression models, etc.); one or more Bayesian (e.g., naïve Bayes models, Gaussian naïve Bayes models, multinomial naïve Bayes models, averaged one-dependence estimators, Bayesian networks, Bayesian belief networks, hidden Markov models, etc.); and/or other forms of models. Example models 140 are discussed with reference to FIGS. 2 and 3.

In some implementations, the server computing system 130 can include a snippet selector 142 (e.g., in addition or alternatively to inclusion of snippet selector 121 at the user computing device 102). In some implementations, the snippet selector 142 can select a snippet of a document for inclusion in an informational display. For example, snippet selector 142 can select a snippet of a document for inclusion in an informational display based on classifications output by the machine-learned opinion classification model 140. In particular, in some implementations, the snippet selector 142 can perform a summarization algorithm that ranks portions from a document by portion importance (possibly as well as other example criteria like ability to stand alone without further context). An example snippet selector 142 is discussed with reference to FIG. 2.

Each of the snippet selectors 121 and 142 includes computer logic utilized to provide desired functionality. Each of the snippet selectors 121 and 142 can be implemented in hardware, firmware, and/or software controlling a general purpose processor. For example, in some implementations, each of the snippet selectors 121 and 142 includes program files stored on a storage device, loaded into a memory and executed by one or more processors. In other implementations, each of the snippet selectors 121 and 142 includes one or more sets of computer-executable instructions that are stored in a tangible computer-readable storage medium such as RAM hard disk or optical or magnetic media.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. In some implementations, performing backwards propagation of errors can include performing truncated backpropagation through time. The model trainer 160 can perform a number of generalization techniques (e.g., weight decays, dropouts, etc.) to improve the generalization capability of the models being trained.

In particular, the model trainer 160 can train the machine-learned opinion classification models 120 and/or 140 based on a set of training data 162. In one particular example, the training data 162 can include two training datasets. A first training dataset can include opinion pieces from a news corpus, where opinion labels are applied at the document level. A second, better quality training dataset can include documents with portions that have been individually and manually labelled using crowdsourcing. For example, the labels can be applied according to two classes: sentence reflects the opinion of the author, and everything else; according to the three classes described above which include a distinction between author opinion and reported opinion; or according to other labelling schemes.

In some implementations, the first training dataset can be used to improve or seed the classification model 120 and/or 140 (e.g., to learn an embedding, to leverage labeled but noisy data), while the second training dataset enables training of a higher precision classifier 120 and/or 140. In other implementations, the machine-learned opinion classification model 120 and/or 140 can be trained on only the second training dataset. Further, in some implementations, a pre-trained language processing model (e.g., trained on other tasks) can be re-trained on the first and/or second training datasets to generate the opinion classification model 120 and/or 140. Example pre-trained language processing models include the Word2vec ground of models. In implementations in which the opinion classification model 120 and/or 140 includes multiple models (e.g., an embedding model and a label prediction model), training can be performed end-to-end on the models jointly.

In some implementations, the first training dataset can be generated by identifying opinion articles through application of various search rules. As one example, opinion articles can be identified by searching for substrings, such as "opinion" or "oped", in the article URLs. For classification purposes, these documents are then labelled as "opinion". As another example, agency articles can be identified by looking for substrings such as "(AP)"—Associated Press—in the body of the document. This assumes that agency articles, which are re-published on many news outlets, usually have a neutral tone. For classification purposes, these documents are labelled as "not opinion". For the first training dataset, all sentences from the identified articles can be extracted. The label of the document can then be assigned to each portion (e.g., sentence) from such document. This provides a relatively simple and fast technique to generate a large first training dataset.

However, this first training dataset has a drawback due to the way it is constructed: the resulting classification model learns to predict whether the sentence is likely to be part of an opinion piece, rather than whether it expresses an opinion. Thus, training on the more fine-grained second training dataset results in significant improvement. Likewise, in some implementations, training of the model is performed only using the second training dataset and not the first.

In some implementations, for the second dataset, additional data can be collected on a number of related aspects: Whether the sentence is boilerplate ("Sign up to receive our awesome newsletter!"); Whether the opinion expressed is the author's own (as opposed to reported opinions in, for example, quotes); Whether the sentence can stand on its own; and/or Whether the sentence can be understood only knowing the article title.

Thus, the example training schemes described above enable the machine-learned opinion classification model 120 and/or 140 to learn how opinions are expressed from a large annotated corpus. Further, in implementations in which the model 120 and/or 140 takes the entire portion as an input (e.g., models that include a recurrent neural network that takes each word as input sequentially), the model 120 and/or 140 can be trained to understand and leverage structural information included in the portions, including, for example, sentence structure.

In particular, the training computing system 150 can obtain training data 162 that includes document data that has been labeled with opinion labels. The training computing system 150 can determine correlations between aspects of the document data (e.g., sentence structure, word choice, punctuation, syntax, formatting, and/or document features) and opinion classifications. The training computing system 150 can iteratively update the correlations upon receipt of new document data to form the opinion classification model 120 and/or 140. Once trained, the opinion classification model 120 and/or 140 can be used to identify opinions within documents.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 1A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 1B:
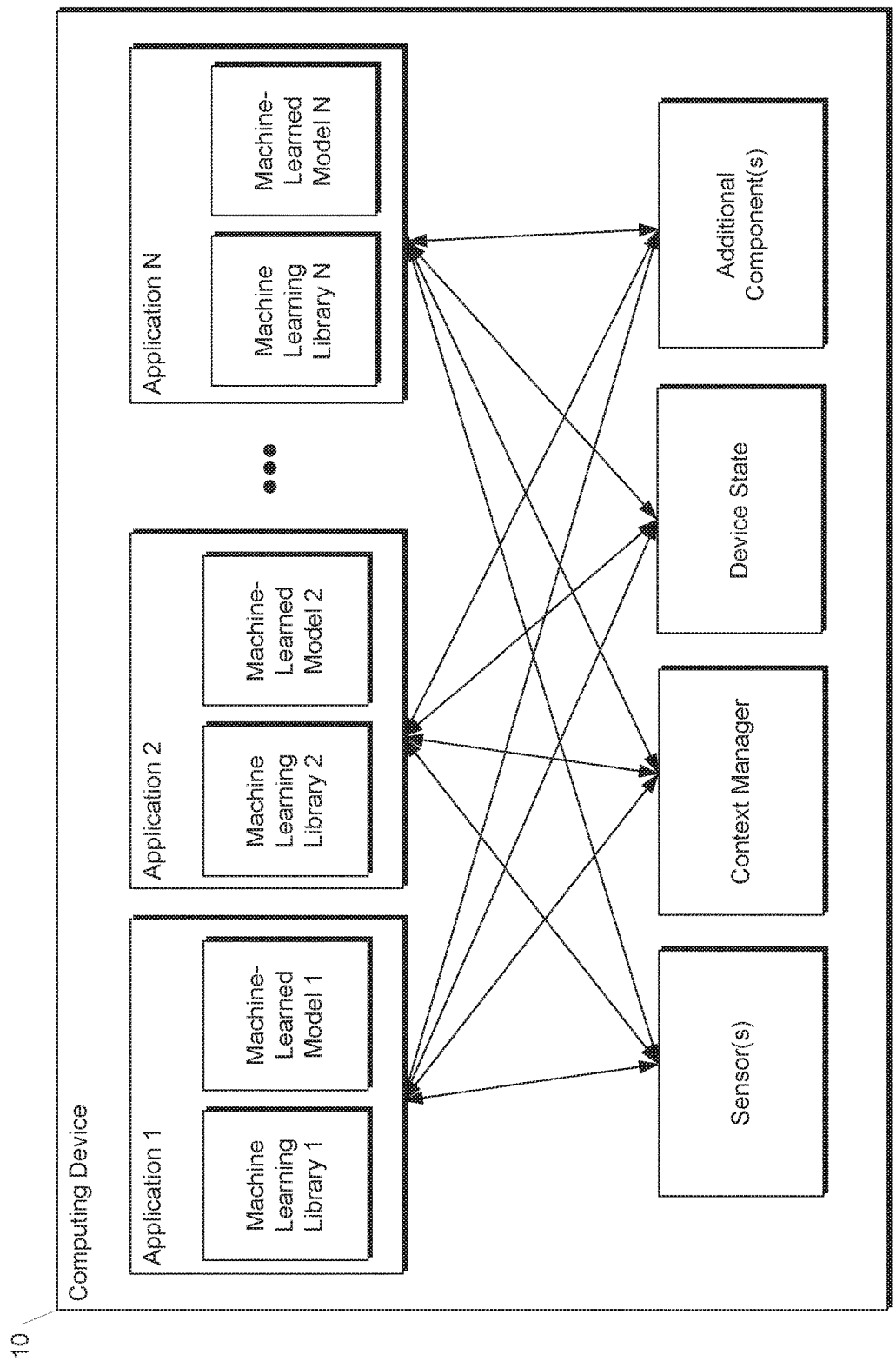
FIG. 1B depicts a block diagram of an example computing device according to example embodiments of the present disclosure.

FIG. 1B depicts a block diagram of an example computing device 10 according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a news aggregation or presentation application, a text messaging application, an email application, a dictation application, a virtual keyboard application, a browser application, etc.

As illustrated in FIG. 1B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 1C:
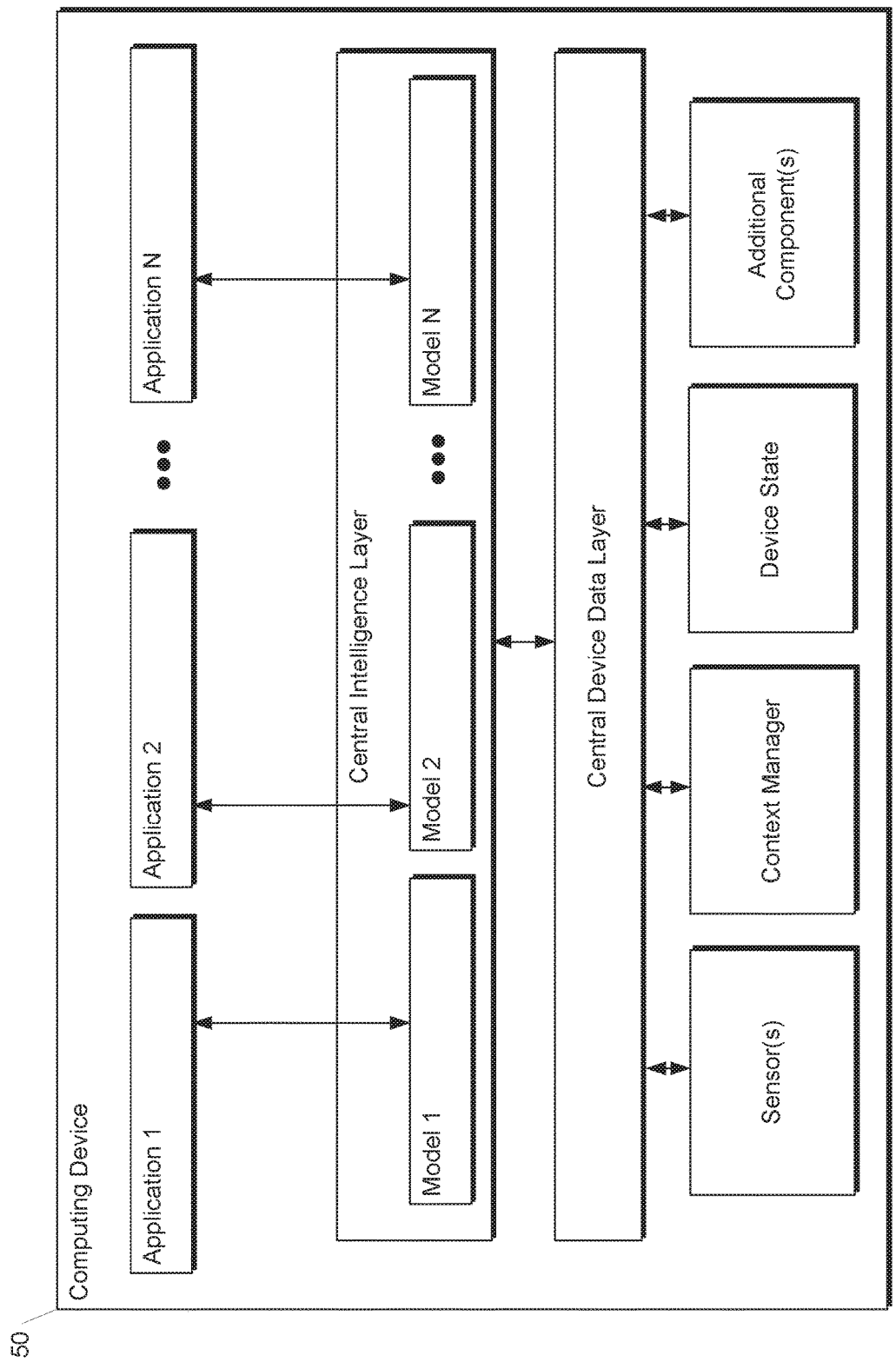
FIG. 1C depicts a block diagram of an example computing device according to example embodiments of the present disclosure.

FIG. 1C depicts a block diagram of an example computing device 50 according to example embodiments of the present disclosure. The computing device 50 can be a user computing device or a server computing device.

The computing device 50 includes a number of applications (e.g., applications 1 through N). Each application is in communication with a central intelligence layer. Example applications include a news aggregation or presentation application, a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 1C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single opinion classification model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 1C, the central device data layer can communicate with a number of other components of the computing device, such as, for example, one or more sensors, a context manager, a device state component, and/or additional components. In some implementations, the central device data layer can communicate with each device component using an API (e.g., a private API).

Example Model Arrangements

Figure 2:
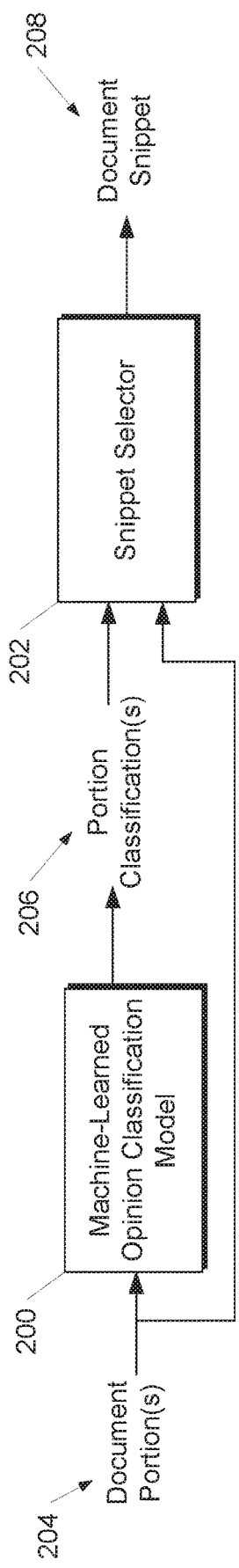
FIG. 2 depicts a block diagram of an example workflow to generate document snippets according to example embodiments of the present disclosure.

FIG. 2 depicts a block diagram of an example workflow to generate document snippets according to example embodiments of the present disclosure. The workflow illustrated in FIG. 2 includes an example machine-learned opinion classification model 200 and a snippet selector 202.

In some implementations, the machine-learned opinion classification model 200 is trained to receive one or more portions 204 of a document and, as a result of receipt of the document portions 204, provide a classification 206 for each of the received portions 204.

More particularly, according to an aspect of the present disclosure, a computing system can use or leverage the machine-learned opinion classification model 200 to identify portions 204 of a document that convey opinion (e.g., as contrasted with quotes and facts). Stated differently, this classification model 200 can be used to filter "un-interesting" portions for stance detection purposes, such as, for example, quotes and facts. The computing system can input each portion 204 into the opinion classification model 200 and the model 200 can produce a classification 206 for the input portion. Example documents include news articles, web pages, transcripts of a conversation (e.g., interview), transcripts of a speech, and/or other documents. Example portions 204 of a document include sentences, pairs of consecutive sentences, paragraphs, pages, etc. Portions can be overlapping or non-overlapping.

As one example, in some implementations, the machine-learned opinion classification model 200 can include one or more artificial neural networks ("neural networks"). Example neural networks include feed-forward neural networks, recurrent neural networks, convolutional neural networks, and/or other forms of neural networks. Neural networks can include layers of hidden neurons and can, in such instances, be referred to as deep neural networks.

Figure 3:
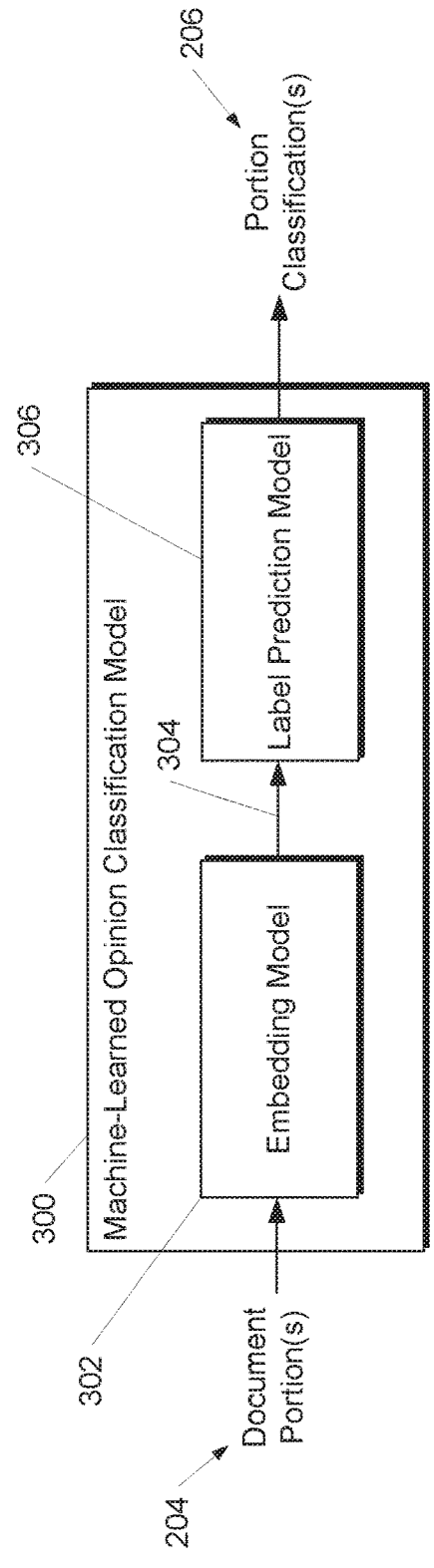
FIG. 3 depicts a block diagram of an example machine-learned opinion classification model according to example embodiments of the present disclosure.

In one specific example, the machine-learned opinion classification model can include an embedding model that encodes a received portion of the document. In particular, FIG. 3 illustrates one example machine-learned opinion classification model 300 that includes an embedding model 302 and a label prediction model 306.

For example, the embedding model 302 can produce an embedding 304 at a final or a close to final, but not final layer of the model 302. The embedding 304 can encode information about the portion 204 of the document in an embedding dimensional space. The label prediction model 306 can generate the classification label 206 based on the encoding or embedding 304.

As examples, the embedding model 302 can be or include a recurrent neural network (e.g., a unidirectional or bidirectional long short-term memory network) while the label prediction model 306 can be or include a feed-forward neural network (e.g., a shallow network with only a few layers). As another example, the embedding model 302 can be or include a convolutional neural network that has one dimensional kernels designed over words. As further examples, the machine-learned opinion classification model 200 of FIG. 2 or 300 of FIG. 3 can include or leverage sentence embeddings, bag-of-word models (e.g., unigram, bigram and/or trigram levels), and/or other forms of models.

Referring again to FIG. 2, in some implementations, the opinion classification model 200 can be a binary classifier. For example, the model can produce a label 206 of "Opinion" or "Not Opinion" for each portion 204 of the document that is input into the model 200. In other implementations, the opinion classification model 200 can be a multi-class classification model. In particular, in some implementations, the classification model 200 can output labels 206 according to one of following three classes: Not Opinion; Reported Opinion (e.g., representing the opinion of a third party such as, for example, quoting someone's opinion); and Author Opinion (e.g., representing the opinion of the author of the document). In some implementations, portions classified as "Opinion" or "Author Opinion" can be considered for inclusion in an informational display (e.g., in the form of opinionated snippets). In yet further implementations, additional and/or different labels can be used versus those described above. As one example, in some implementations, additional labels can be used (e.g., in addition to "Opinion" or "Not Opinion") that account for cases in which a portion of the document is challenging to classify (e.g., is on the border between opinion and not-opinion) or contains a mix of fact and opinion. For example, such additional labels could include a "May Be Opinion" label, a "Possible Author's Perspective" label, and/or a "Mixed Fact and Opinion" label. Generally, any number of different labelling schemes can be designed and applied during training to train the labelling output of the classification model 200.

In some implementations, the classification model 200 can simply output a label while, in other implementations, the classification model 200 can output a classification score and the label can be generated based on the classification score (e.g., by comparing the score to a threshold). In some instances, the classification score can be referred to as a confidence score. Generally, a larger classification score indicates that the corresponding portion is more opinionated or more probably opinionated. In some implementations, the classification model can output a single score and the label can be generated based on such single classification score (e.g., by comparing the score to one or more thresholds). In other implementations, the classification model 200 can output a respective score for each available label and one or more labels can applied to the portion based on the multiple scores (e.g., by comparing each respective score to a respective threshold and/or by selecting the label that received the highest score).

In some implementations, additional features can be used (e.g., provided as input alongside the document itself to the model 200 or used separately as additional selection logic). Examples of such additional features include: a lexicon, main article topic(s), surrounding context, story context, document type (e.g., news article vs. medical academic paper), and/or other features. In one particular example, only portions of a document that were classified as opinion and that also have at least two strongly subjective words according to a subjectivity lexicon are selected.

According to another aspect of the present disclosure, as illustrated in FIG. 2, the snippet selector 202 can generate a snippet 208 or summary for the document based on the classifications 206 generated by the opinion classification model 200. In particular, in some implementations, the snippet selector 202 can perform a ranking process that determines which portion 204 (e.g., sentence(s)) would serve best as a standalone snippet 208. In some instances, the selected portion should generally be relevant to the story and read well without context. As examples, the snippet selector 202 can generate the ranking based at least in part on a summarization of each respective portion, identification of respective entities mentioned by each respective portion, and/or a respective classification score assigned to each respective portion by the machine-learned opinion classification model. Determining importance can be done by looking at the document only, or by looking at clusters of documents. This latter option allows the snippet selector 202 to diversify the point-of-views highlighted in the snippets.

In particular, in some implementations, the snippet selector 202 can perform one or more document summarization algorithms to rank the portions 204 of the document and select the snippet 208. In some implementations, the document summarization algorithm will choose a set of candidate portions 204 for each document, taking into account portion importance, portion opinionatedness (e.g., as reflected by the portion's corresponding classification score 206), and/or snippet diversity across articles in the cluster (e.g., story).

In one example, the snippet selector 202 can perform a standard document summarization algorithm, but restrict the input to the algorithm to only portions 204 labelled as opinions by the classification model 200. As another example, the summarization algorithm can discard all sentences unsuitable as snippets, and then the snippet selector 202 can select the most opinionated sentence, as indicated by the scores 206 produced by the classification model 200.

As yet another example, a document summarization algorithm can combine both sentence importance and opinionatedness to re-rank sentences. For example: sort in decreasing order of importance_score*opinion_confidence. If no sentence is deemed opinionated, a non-opinionated sentence may be returned. This example implementation is the most flexible and also allows incorporation of additional heuristics (e.g., the snippet 208 could be restricted to the top three portions according to the summarization algorithm).

Example Methods

Figure 4:
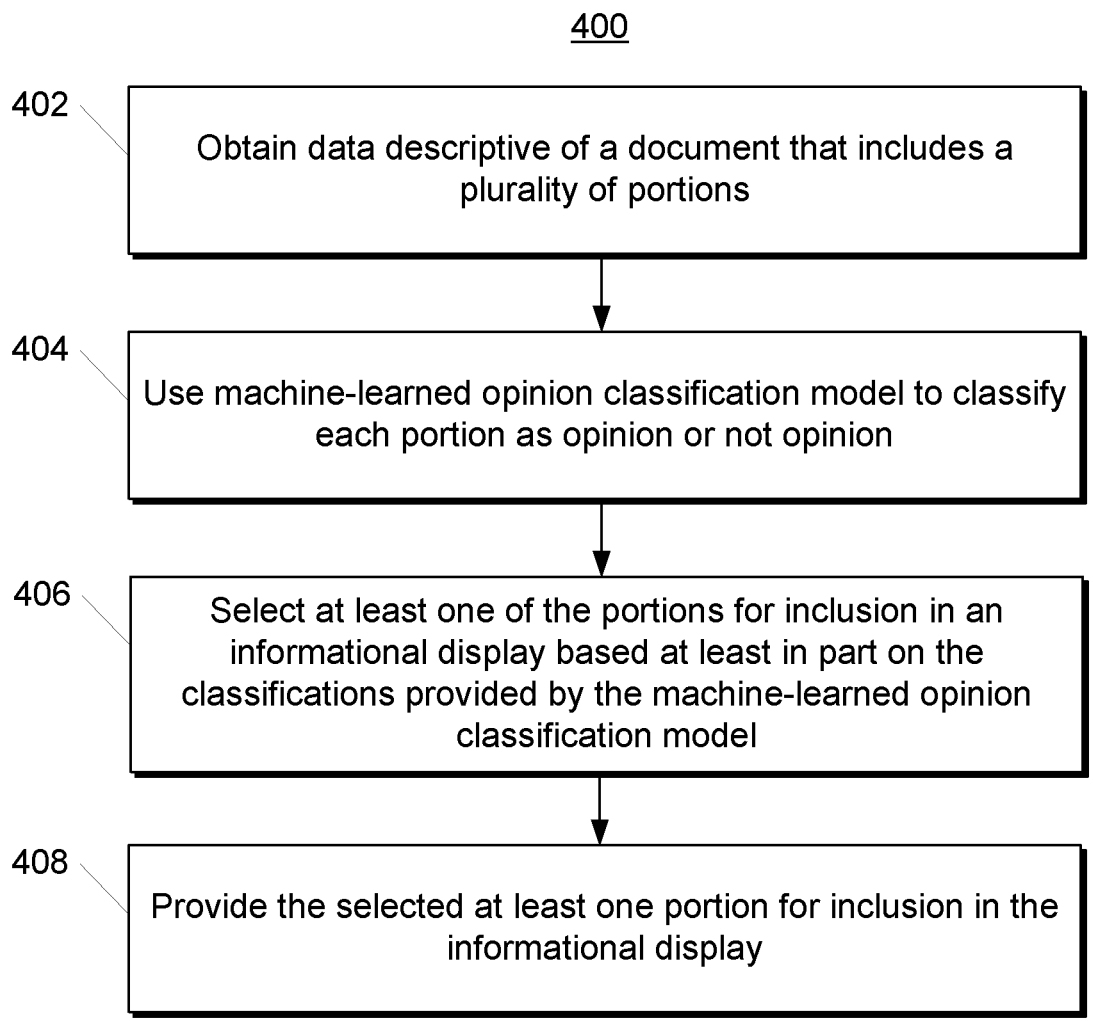
FIG. 4 depicts a flow chart of an example method to provide a document snippet for inclusion in an informational display according to example embodiments of the present disclosure.

FIG. 4 depicts a flow chart diagram of an example method 400 according to example embodiments of the present disclosure. Although FIG. 4 depicts steps performed in a particular order for purposes of illustration and discussion, the methods of the present disclosure are not limited to the particularly illustrated order or arrangement. The various steps of the method 400 can be omitted, rearranged, combined, and/or adapted in various ways without deviating from the scope of the present disclosure.

At 402, a computing system obtains data descriptive of a document that includes a plurality of portions. Example documents include news articles, web pages, transcripts of a conversation (e.g., interview), transcripts of a speech, and/or other documents. Example portions of a document include sentences, pairs of consecutive sentences, paragraphs, pages, etc. Portions can be overlapping or non-overlapping. Thus in one particular example, the document can be a news article and the portions of the document can be a plurality of textual sentences included in the news article.

At 404, the computing system uses a machine-learned opinion classification model to classify each portion of the document as opinion or not opinion. In some implementations, using the classification model at 404 can include respectively inputting each portion of the document into the machine-learned opinion classification model and receiving, as an output of the machine-learned opinion classification model, a respective classification of each input portion of the document as being opinion or not opinion.

In some implementations, using the classification model at 404 can further include inputting additional feature data into the machine-learned opinion classification model alongside one or more portions of the document. As examples, the additional feature data can include: lexicon data; topic data associated with the document; a content type associated with the document; surrounding context data; and/or story context data.

At 406, the computing system selects at least one of the portions for inclusion in an informational display based at least in part on the classifications provided by the machine-learned opinion classification model. As one example, in some implementations, selecting the at least one portion at 406 can include extracting from the document portions of the document that were classified as being opinion and selecting at least one of the extracted portions of the document for inclusion in the informational display.

As another example, in some implementations, selecting the at least one portion at 406 can include generating a ranking of portions of the document that were classified as being opinion based at least in part on a summarization of each respective portion, identification of respective entities mentioned by each respective portion, and/or a respective classification score assigned to each respective portion by the machine-learned opinion classification model. The computing system can select at least one of the portions of the document that were classified as being opinion for inclusion in an informational display based at least in part on the generated ranking.

As another example, in some implementations, selecting the at least one portion at 406 can include clustering the document into one of a plurality of document clusters based at least in part on a comparison of the portions of the document that were classified as being an opinion with additional portions of other documents that have been classified as being opinion. In some implementations, The computing system can select one or more portions from each of at least two of the plurality of document clusters for inclusion in an informational display.

At 408, the computing system provides the selected at least one portion for inclusion in the informational display. For example, the informational display can be included in a visual user interface. As one particular example, the informational display can provide a number of documents that relate to a same topic or subject and can provide, for each document, a respective selected portion from such document that was classified as opinion.

Example User Interfaces

Figure 5:
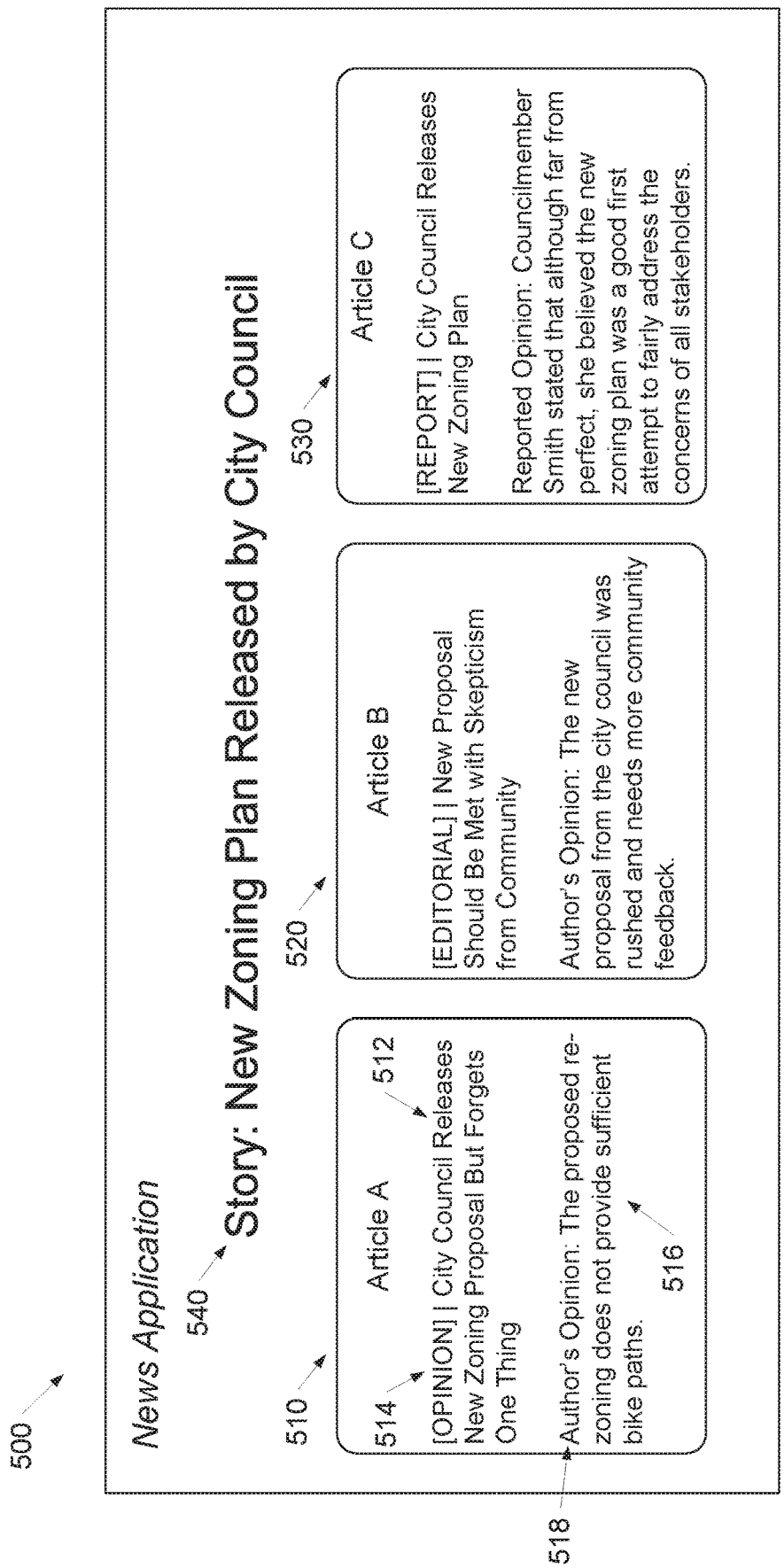
FIG. 5 depicts an example informational display according to example embodiments of the present disclosure.

FIG. 5 depicts an example informational display 500 according to example embodiments of the present disclosure. The example informational display 500 is provided in a visual user interface of a news application. The informational display 500 includes provides three articles 510, 520, and 530 about a same news story 540. Each article 510, 520, and 530 is presented with its title and also an article type label that identifies the type of article. For example, article 510 is shown with title 512 and article type label 514 that identifies the article 510 as an opinion article. Likewise, article 520 is labeled as an editorial while article 530 is labeled as a report.

Each article 510, 520, and 530 is also presented with a summary snippet and also a classification label that is associated with the summary snippet. In particular, the classification label can be a label that was applied to the summary snippet by the machine-learned opinion classification model.

As an example, article 510 is shown with summary snippet 516 and classification label 518 that indicates that the summary snippet 516 is the author's opinion. Likewise, the summary snippet of article 520 is labeled as the author's opinion while the summary snippet of article 530 is labeled as a reported opinion.

The example informational display 500 is provided as one example only; the present disclosure can be used in conjunction with or for many different types of user interfaces and informational displays. For example, the classification labels can be provided in the document itself, in addition or alternatively to as part of a summary of the document.

In addition, as illustrated in FIG. 5, the classification label can be text-based. That is, the label can be explicitly provided as text next to the portion to which such label was applied. In other examples, the classification labels can be format-based. For example, portions labelled as opinion can be shown with a different formatting, to indicate their having been identified as opinion. As one example, the portions labelled as opinion can be shown in italics, highlighted with a certain color, provided in an alternative font, located in an opinion region of the display, etc.

In yet another example, the classification label can be an audio-based label that is vocalized as part of an audio user interface. In one example, a smart speakers or interactive personal assistant can provide a summary of a document (e.g., news article) and can vocalize a classification label associated with the summary (e.g., "the opinion from the article is . . . "). In another example, when a document is being vocalized (e.g., by a smart speaker), portions of the document labeled as opinion can be vocalized with an alternative tone, pitch, style, and/or identity of voice.

Thus, many different user interfaces can be used to provide classification information associated with documents, including both visual and audio user interfaces.

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computing system, comprising:
   one or more processors;
   one or more non-transitory computer-readable media that collectively store:
   a machine-learned opinion classification model configured to classify portions of documents as either opinion or not opinion; and
   instructions that, when executed by the one or more processors, cause the computing system to perform operations, the operations comprising:
   obtaining data descriptive of a document that comprises a one or more portions, wherein the document comprises a news article;
   inputting at least a first portion of the document into the machine-learned opinion classification model, wherein the machine-learned opinion classification model comprises:
   an embedding model configured to receive the first portion of the document and, in response to receipt of the first portion of the document, provide an embedding that encodes information descriptive of the first portion of the document; and
   a label prediction model that receives the embedding and, based at least in part on the embedding, provides a first classification of the first portion of the document as being opinion or not opinion;
   receiving, as an output of the machine-learned opinion classification model, the first classification of the first portion of the document as being opinion or not opinion and a confidence score associated with the first classification, the confidence score indicative of an opinionatedness of the first portion;
   identifying at least one candidate portion of the one or more portions based at least in part on the first classification;
   determining at least one importance score associated with the at least one candidate portion based at least in part on the confidence score assigned to each candidate portion by the machine-learned opinion classification model, wherein the at least one importance score is indicative of an ability of the candidate portion to stand alone as representative of the document without further context
   selecting a selected portion of the document as one of the at least one candidate portion based at least in part on the at least one importance score and the confidence score; and
   providing for display the first selected portion of the document in a document summary.

2. The computing system of claim 1, wherein the one or more portions of the document comprise a plurality of textual sentences included in the document.

3. The computing system of claim 1, wherein the operations further comprise:

employing the machine-learned opinion classification model to obtain a respective classification of each of the one or more portions as being opinion or not opinion;
extracting from the document portions of the document that were classified as being opinion; and
providing at least one of the portions of the document that were classified as being opinion for inclusion in an informational display.

4. The computing system of claim 1, wherein the embedding model comprises a recurrent neural network or a convolutional neural network.

5. The computing system of claim 1, wherein the operations further comprise:
   inputting additional feature data into the machine-learned opinion classification model alongside the first portion of the document, wherein the additional feature data comprises one or more of:
   lexicon data;
   topic data associated with the document;
   a content type associated with the document;
   surrounding context data; or
   story context data.

6. The computing system of claim 1, wherein the operations further comprise:
   employing the machine-learned opinion classification model to obtain a respective classification of each of the one or more portions as being opinion or not opinion;
   generating a ranking of portions of the document that were classified as being opinion based at least in part on one or more of a summarization of each respective portion, identification of respective entities mentioned by each respective portion, or a respective classification score assigned to each respective portion by the machine-learned opinion classification model; and
   selecting at least one of the portions of the document that were classified as being opinion for inclusion in an informational display based at least in part on the ranking.

7. The computing system of claim 1, wherein the machine-learned opinion classification model comprises a binary classifier that is configured to classify the first portion of the document as being either opinion or not opinion.

8. The computing system of claim 1, wherein the machine-learned opinion classification model comprises a multi-class classifier that is configured to classify the first portion of the document as being author opinion, reported opinion, or not opinion.

9. The computing system of claim 8, wherein the operations further comprise:
   analyzing additional portions of other documents that were classified as reported opinions to identify a most commonly reported opinion.

10. The computing system of claim 1, wherein the first classification of the first portion of the document as being opinion or not opinion comprises a classification score that indicates a degree to which the first portion of the document is opinion.

11. The computing system of claim 1, wherein the operations further comprise:
    employing the machine-learned opinion classification model to obtain a respective classification of each of the one or more portions of the document as being opinion or not opinion; and
    clustering the document into one of a plurality of document clusters based at least in part on a comparison of the portions of the document that were classified as being an opinion with additional portions of other documents that have been classified as being opinion.

12. The computing system of claim 11, wherein the operations further comprise:
selecting one or more portions from each of at least two of the plurality of document clusters for inclusion in an informational display.

13. The computing system of claim 1, wherein:
the machine-learned opinion classification model has been trained on a first training dataset and a second training dataset;
the first training dataset comprises a plurality of first training documents, wherein each first training document is assigned a single label that labels such first training document as either an opinion or not an opinion; and
the second training dataset comprises a plurality of second training documents, wherein each second training document is assigned a plurality of labels that respectively label a plurality of portions of such second training document as either opinion or not opinion.

14. A computer-implemented method, comprising:
obtaining, by one or more computing devices, data descriptive of a document that comprises a plurality of portions, wherein the document comprises a news article;
inputting, by the one or more computing devices, each of the plurality of portions into a machine-learned opinion classification model to obtain a respective classification of each of the plurality of portions as being opinion or not opinion, wherein the machine-learned opinion classification model comprises:
an embedding model configured to receive each of the plurality of portions of the document and, in response, provide a respective embedding that encodes information descriptive of each portion of the document; and
a label prediction model that receives the respective embedding for each portion and, based at least in part on the respective embedding, provides the respective classification of the portion of the document as being opinion or not opinion;
receiving, by the one or more computing devices and as an output of the machine-learned opinion classification model, a first classification of a first portion of the document as being opinion or not opinion and a confidence score associated with the first classification, the confidence score indicative of an opinionatedness of the first portion;
identifying at least one candidate portion of the plurality of portions based at least in part on the first classification;
determining at least one importance score associated with the at least one candidate portion based at least in part on the confidence score assigned to each candidate portion by the machine-learned opinion classification model, wherein the at least one importance score is indicative of an ability of the candidate portion to stand alone as representative of the document without further context
selecting, by the one or more computing devices, at least one selected portion of the document classified as being opinion and based at least in part on the at least one importance score and the confidence score; and providing, by the one or more computing devices, the at least one selected portion of the document for inclusion in an informational document summary display.

15. The computer-implemented method of claim 14 wherein the document comprises a news article, and wherein the plurality of portions of the document comprise a plurality of textual sentences included in the news article.

16. The computer-implemented method of claim 14, wherein selecting, by the one or more computing devices, the at least one portion of the document classified as being an opinion comprises:
generating, by the one or more computing devices, a ranking of portions of the document that were classified as being opinion based at least in part on one or more of a summarization of each respective portion, identification of respective entities mentioned by each respective portion, or a respective classification score assigned to each respective portion by the machine-learned opinion classification model; and
selecting, by the one or more computing devices based at least in part on the ranking, the at least one portion of the document for inclusion in the informational display.

17. A system comprising:
one or more processors; and
one or more non-transitory computer-readable media that store instructions that when executed by the one or more processors cause the system to provide a user interface that includes one or more opinion labels respectively applied to one or more portions of a document, wherein the document comprises a news article, by a machine-learned opinion classification model, wherein the opinion label for each of the one or more portions of the document indicates whether such portion of the document is opinion or not opinion;
wherein the machine-learned opinion classification model comprises:
an embedding model configured to receive each of the one or more portions of the document and, in response, provide a respective embedding that encodes information descriptive of each portion of the document; and
a label prediction model that receives the respective embedding for each portion and, based at least in part on the respective embedding, provides the respective label for the portion of the document as being opinion or not opinion, a confidence score associated with the respective label, the confidence score indicative of an opinionatedness of the portion, and an importance score associated with the portion based at least in part on the confidence score assigned to each portion by the machine-learned opinion classification model, wherein the importance score is indicative of an ability of the portion to stand alone as representative of the document without further context.

18. The system of claim 17, wherein at least one of the one or more opinion labels included in the user interface is a text-based label included in a visual user interface.

19. The system of claim 17, wherein at least one of the one or more opinion labels included in the user interface is a formatting-based label in which at least one portion of the document that corresponds to such at least one opinion label is formatted in a particular style to indicate whether the at least one portion of the document is opinion or not opinion.

20. The system of claim 17, wherein at least one of the one or more opinion labels included in the user interface is a vocalized label that is vocalized via an audio user interface.

\* \* \* \* \*